Patented June 16, 1942

2,286,274

UNITED STATES PATENT OFFICE 2,286,274

RECOVERY OF SOLID FERRICYANIDES

William H. Hill, Mount Lebanon, Pa., assignor to American Cyanamid Company, New York, N. Y., a corporation of Maine No Drawing. Application December 5, 1939, Serial No. 307,601

1 Claim. (Cl. 23—77)

The present invention relates to the recovery of the alkali metal and ammonium ferricyanides in solid form.

The invention further contemplates the recovery of such solid compounds in the presence of stabilizing agents so as to prevent the tendency to revert to the ferro salt.

It is well known that the alkali metal and ammonium ferricyanides may be produced in aqueous solution by so-called oxidation of the corresponding ferrocyanide compound by means of chlorine. As a result of this procedure, concentrated solutions may be obtained. Difficulty has been experienced, however, in recovering these salts in solid form, particularly uncontaminated with corresponding ferro salt and the corresponding halogen salt.

Another difficulty encountered in the production of the ferri salts where attempts are made to completely convert the ferro compound, by the use of chlorine, is the tendency to over-chlorinate, in which event the chlorine attacks the cyanogen radical with the eventual production of nitrogen trichloride and/or cyanuric chloride.

It is extremely difficult to recover the solid ferri salts from their aqueous solutions by the normal processes of water removal inasmuch as this involves a considerable expenditure of heat as well as thermal decomposition of the compounds themselves.

Another difficulty experienced is in the keeping qualities of solid ferricyanides in that there is a tendency to revert to the ferro form, particularly in the presence of moisture.

The principal objects of the present invention, therefore, are the recovery of solid alkali metal and ammonium ferricyanides from aqueous solutions thereof in a pure state, without evaporation of water and application of heat, and in a manner which will prevent reversion to ferro either during the process of recovery or subsequent thereto.

The above and other objects are accomplished by taking advantage of the fact that salts of polybasic acids are substantially insoluble in solutions containing more than 50% ammonia. Consequently, if ammonia gas is passed into such solutions of the alkali metal or ammonium ferricyanides, until the above concentration is reached or if the ammonia is added thereto in liquid phase to the same extent, the solid ferri salt will be thrown down as a precipitate. At the same time, the corresponding halogen compounds, being those of a monobasic acid, are soluble in such ammonia solutions. Consequently, a filtering step will remove substantially pure solid ferricyanide, while the contaminating halides pass out with the filtrate.

In view of the fact that the presence of water favors the reversion of ferri to ferro, aqueous solutions of ammonia, even of 50% strength are not preferred. On the other hand, by using liquid ammonia and re-suspending the precipitated ferricyanide in anhydrous liquid ammonia or washing the filter cake containing the ferri salt with anhydrous liquid ammonia the last traces of moisture may be removed and thus the tendency to reversion by reason of the presence of water is prevented. At the same time, any last traces of contaminating halides are likewise removed by this re-suspension or washing procedure. Gentle heating, particularly under vacuum, in a current of dry, inert gas or under such other conditions as may exclude atmospheric moisture, may be used to remove the last traces of ammonia.

The use of ammonia as a precipitating agent for ferricyanides may be advantageously employed as disclosed in my copending application Serial No. 188,955, in which uniformly sized crystals of salts of polybasic acids may be thrown out of their aqueous solutions by advantageous use of this precipitating agent. According to the invention of the above co-pending application, uniform sized crystals are obtained by regulated addition of a precipitating fluid such as ammonia to an aqueous solution of a salt of a polybasic acid, the addition being so regulated as to maintain the solution substantially in a metastable state. When the salt solution reaches a stage of supersaturation and crystal nuclei are formed, the addition of ammonia is either stopped entirely or made at a rate no faster than the rate at which the salt will be thrown out of solution and grow upon the crystals already formed without producing new nuclei.

Therefore, by appropriate regulation of ammonia addition, crystals of ferricyanide salt may be obtained of any size or in a mixture of sizes.

In view of the fact, as above stated, that it is difficult to convert the last traces of ferrocyanide to ferri by means of chlorine without danger of over-chlorination, commercial practices usually stop short of complete conversion, that is, where the ferricyanide solution contains up to approximately 2% of ferro. If no further attempts are made to convert this residual ferro to ferri, crystallization methods must be used to remove this contaminating impurity.

It has been discovered, however, that certain oxidation agents other than the halogens may be used to convert this residual ferro to ferri without danger of attack on the cyanogen radical. The use of such agents not only rids the solution of residual ferrocyanide but the presence of small quantities of such agent in either ferricyanide solutions or the solid salts themselves have the effect of preventing this undesirable reversion even in the presence of moisture. These agents are chosen from those groups of substances other than the free halogens which are capable of combining with one atom of the four alkali metal atoms or ammonium radicals of the ferro compound. It has been discovered that the persulfates are admirably adapted for this purpose. While the persulfate corresponding to the cation constituent of the ferricyanide is preferable yet this is not necessary as any persulfate will accomplish the desired purpose. 2% of the persulfate is eminently satisfactory, although lesser amounts may be used. Even as low as $\frac{1}{10}$ of 1% has a decided desirable effect.

Other agents similarly useful for converting ferrocyanides to ferri and to prevent reversion of ferri to ferro are perborates, perchlorates, percarbonates, bromates, periodates, performates, peracetates, perpropionates, perbutyrates, perbenzoates, percinnamates, percamphorates, perphthalates, diacetyl peroxide, dibenzoyl peroxide, organic persulfonic acids and their salts, such as paratoluene persulfonic acid and naphthalo-$\beta$-persulfonic acid.

Inasmuch as the presence of moisture has a tendency to cause reversion from ferri to ferro, it has been found desirable to carry out the precipitation of the solid salts from the aqueous solution in the presence of such stabilizing persulfates, or other such stabilizers.

As illustrating the power of persulfates to cause conversion of ferrocyanide to the ferri state and to prevent reversion, 2% of ammonium persulfate was added to an aqueous sodium ferricyanide solution analyzing .19% ferro. The ferro content immediately dropped to .005% and periodic analyses on the spectrophotometer over a period of eighty-two days showed no increase in the ferro content.

Of the stabilizer compounds, some of which are mentioned above, the monobasic acids or salts thereof are soluble in aqueous solutions containing ammonia. Consequently, when the solid ferricyanide is filtered in the recovery process, the stabilizer will pass through into the filtrate. Under these circumstances, in order to stabilize the solid ferricyanide against subsequent reversion to the ferro form, it is necessary to add some of the solid stabilizer thereto. This solid mixture will either prevent reversion of the ferri to ferro during storage in the solid phase or, if not, as soon as the mixture is dissolved in water the stabilizer will immediately go into solution, convert any residual ferro to ferri and prevent reversion of ferri to ferro.

Where polybasic acids or their salts are used as stabilizers, they are difficultly or completely insoluble in aqueous ammonia solutions. Consequently, they will be retained as solids on the filter along with the solid ferricyanide. As soon as the mixture is placed in water for use, therefore, a sufficient amount of the stabilizer will go into solution to have the desired effect.

In view of the above, an excess amount of the solid stabilizer may exist along with the solid ferricyanide or the former may be present in excess in solution form in the aqueous ferricyanide without detrimentally affecting the latter.

While the invention has been described with particular reference to specific embodiments, it is to be understood that it is not to be limited thereto but is to be construed broadly and restricted solely by the scope of the appended claim.

I claim:

A method of recovering a ferricyanide of an alkali metal or ammonium from a concentrated aqueous solution thereof, which comprises dissolving ammonia therein until a concentration thereof of not less than 50% is reached from which ferricyanide is precipitated, and separating the latter in solid form from the solution.

WILLIAM H. HILL.